(12) United States Patent
Osawa (10) Patent No.: US 11,593,925 B2
(45) Date of Patent: Feb. 28, 2023

(54) APPARATUS, METHOD, AND STORAGE MEDIUM

(71) Applicant: CANON KABUSHIKI KAISHA, Tokyo (JP)

(72) Inventor: Shinnosuke Osawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 139 days.

(21) Appl. No.: 17/145,822

(22) Filed: Jan. 11, 2021

(65) Prior Publication Data

US 2021/0233218 A1 Jul. 29, 2021

(30) Foreign Application Priority Data

Jan. 23, 2020 (JP) .............................. JP2020-009386

(51) Int. Cl.
*G06T 5/00* (2006.01)
*G06T 5/20* (2006.01)

(52) U.S. Cl.
CPC .............. *G06T 5/009* (2013.01); *G06T 5/002* (2013.01); *G06T 5/20* (2013.01); *G06T 2207/20208* (2013.01)

(58) Field of Classification Search
CPC ........... G06T 5/009; G06T 5/002; G06T 5/20; G06T 2207/20208; G06T 5/007
See application file for complete search history.

(56) References Cited

U.S. PATENT DOCUMENTS

| 6,285,798 | B1* | 9/2001 | Lee ........................ G06T 5/004 382/266 |
| 7,894,684 | B2* | 2/2011 | Monobe ................... H04N 5/20 348/625 |
| 7,995,857 | B2* | 8/2011 | Wang ..................... H04N 5/208 382/199 |
| 9,240,037 | B2* | 1/2016 | Yamaguchi ........ H04N 5/23229 |
| 9,319,620 | B2* | 4/2016 | Fujine .................. G09G 3/3426 |
| 9,749,506 | B2* | 8/2017 | Matsumoto ............ G06T 5/008 |
| 9,800,793 | B2* | 10/2017 | Chang .................... G06V 10/60 |
| 10,628,928 | B2* | 4/2020 | Kimura .................. G06T 5/009 |
| 10,764,468 | B2* | 9/2020 | Kimura .................. G06T 5/007 |
| 2015/0117771 | A1* | 4/2015 | Sasaki ..................... G06T 5/007 382/164 |
| 2015/0163391 | A1* | 6/2015 | Osawa ................. H04N 5/2356 348/222.1 |
| 2015/0221071 | A1* | 8/2015 | Matsumoto ............ G06T 5/008 382/167 |

FOREIGN PATENT DOCUMENTS

JP          2007293528 A      11/2007

* cited by examiner

*Primary Examiner* — Andrae S Allison
(74) *Attorney, Agent, or Firm* — Canon U.S.A., Inc. IP Division (57) ABSTRACT

A method includes detecting a gradation area in an input image, and performing, based on a detection result acquired by the detecting, for an area that is not the gradation area, gain processing on the input image by using a gain based on a first gain characteristic in which different gains are set depending on luminance values, whereas performing, for the gradation area, gain processing on the input image by using a gain in which an amount of change in gain with respect to a change in luminance value is more reduced than the first gain characteristic.

11 Claims, 7 Drawing Sheets

APPARATUS, METHOD, AND STORAGE MEDIUM

BACKGROUND OF THE DISCLOSURE

Field of the Disclosure

The aspect of the embodiment relates to an apparatus, a method, and a storage medium.

Description of the Related Art

Figure 7:
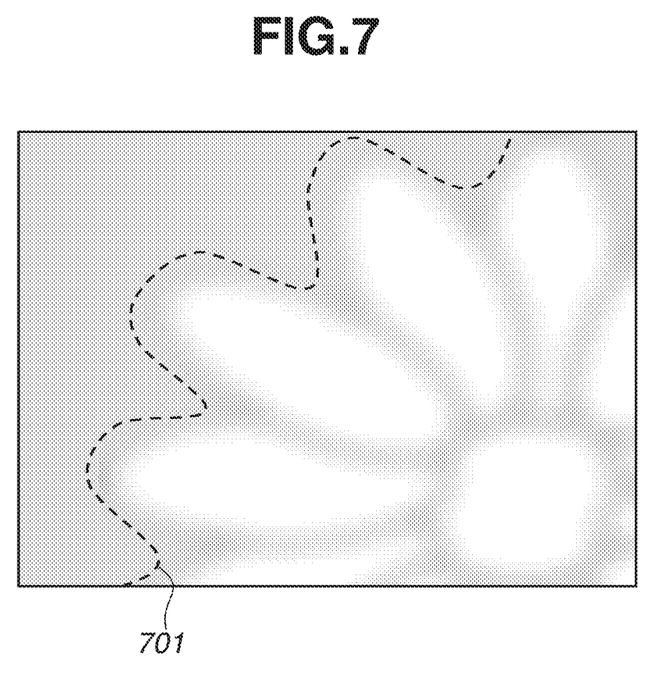
FIG. 7 is a diagram illustrating a false contour in a gradation area.

For image processing apparatuses such as digital cameras, tone compression processing by which a dark portion is brightened and a bright portion is darkened has been discussed for an image acquired by capturing a wide dynamic range scene to reproduce characteristics of the scene as much as possible (for example, Japanese Patent Application Laid-Open No. 2007-293528). If such tone compression processing is performed on an image, a false contour 701 as indicated by a dotted line illustrated in FIG. 7 may be generated in a gradation area such as an optically blurred portion.

SUMMARY OF THE DISCLOSURE

According to an aspect of the embodiment, an apparatus includes a detection unit configured to detect a gradation area in an input image, and a processing unit configured to, based on a detection result acquired by the detection unit, for an area that is not the gradation area, use a gain based on a first gain characteristic in which different gains are set depending on luminance values to perform gain processing on the input image, and, for the gradation area, use a gain in which an amount of change in gain with respect to a change in luminance value is more reduced than the first gain characteristic to perform gain processing on the input image.

Further features of the disclosure will become apparent from the following description of exemplary embodiments with reference to the attached drawings.

DESCRIPTION OF THE EMBODIMENTS

Hereinafter, an exemplary embodiment will be described with reference to the drawings.

Figure 1:
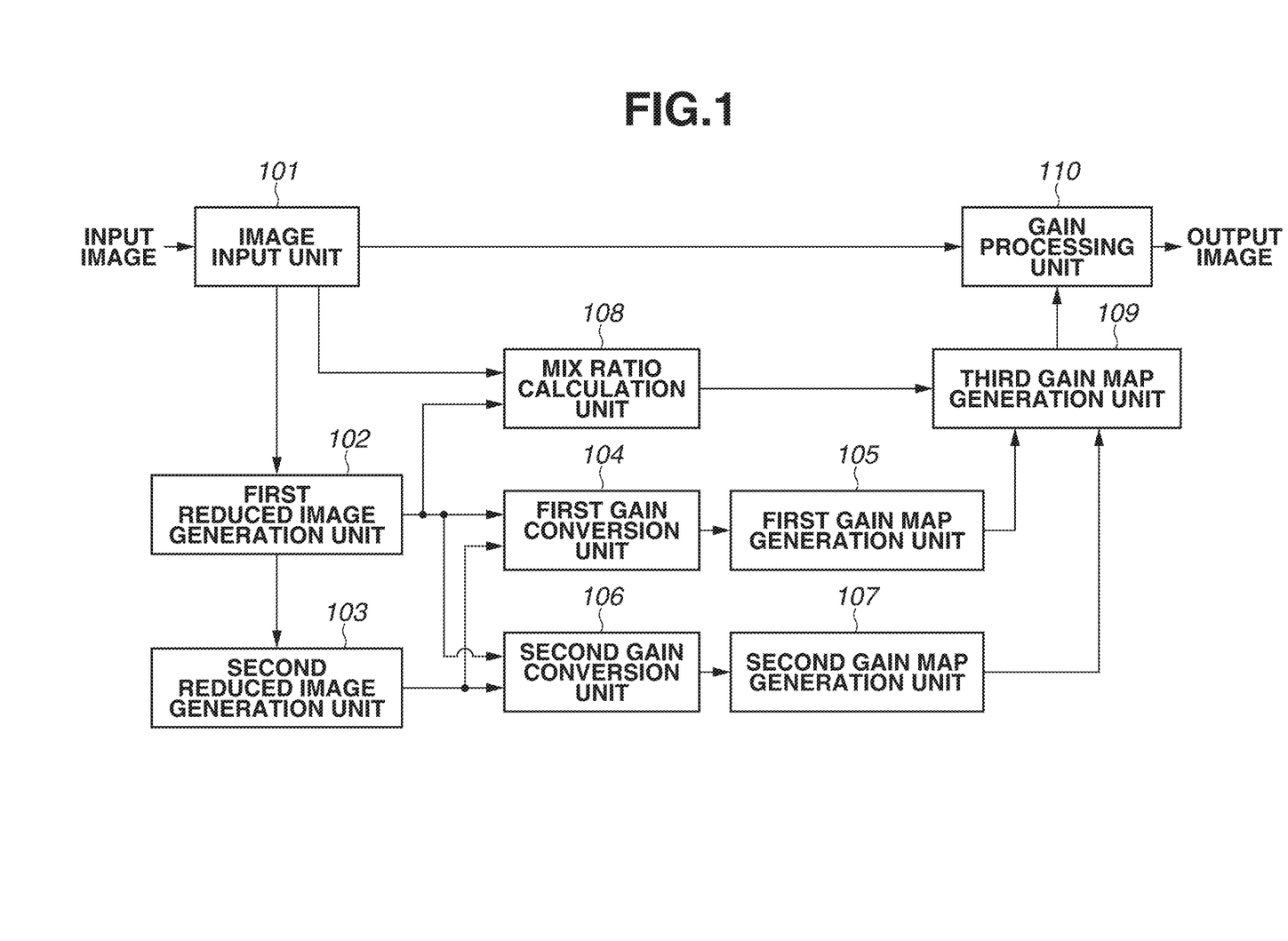
FIG. 1 is a diagram illustrating a configuration example of an image processing apparatus according to the present exemplary embodiment.
Figure 2A:
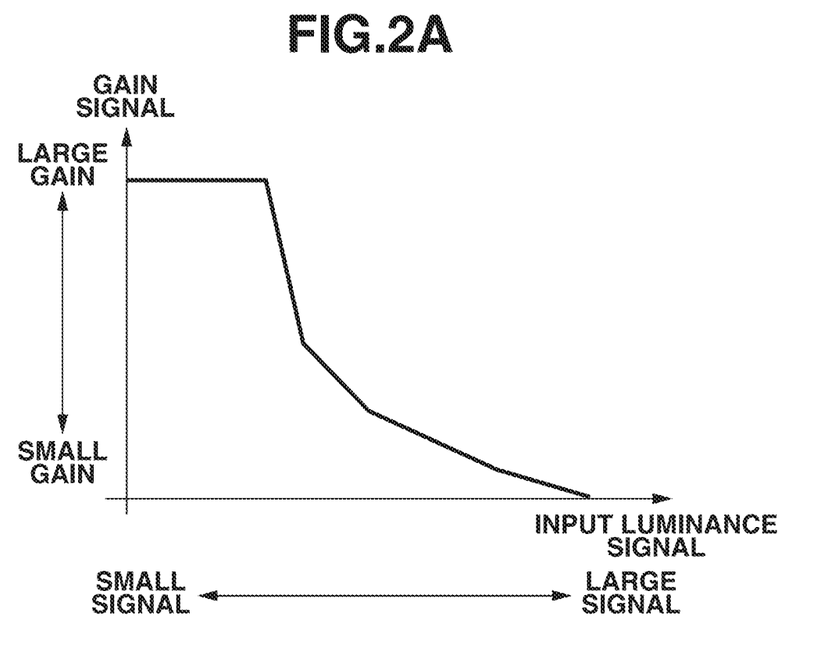
FIGS. 2A and 2B are diagrams illustrating a tone characteristic and a gain map, respectively.
Figure 2B:
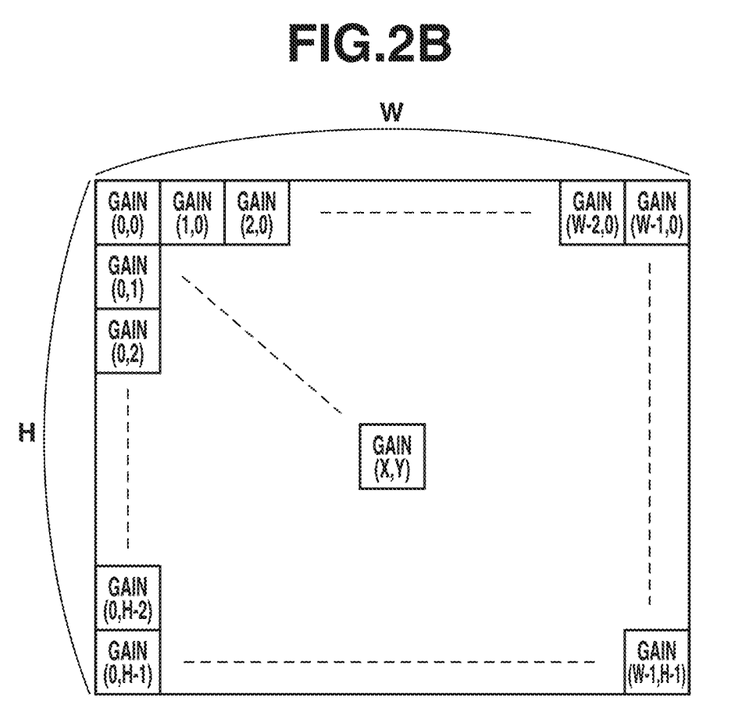

FIG. 1 is a block diagram illustrating a configuration example of an image processing apparatus according to one exemplary embodiment. The image processing apparatus according to the present exemplary embodiment detects a gradation area such as an optically blurred portion in an image to be input, and generates gain maps in which different gain characteristics are applied to the gradation area and an area that is not the gradation area to perform gain processing on the image. The term "gain characteristic" refers to a table where a horizontal axis indicates an input luminance signal and a vertical axis indicates a gain signal as illustrated in an example in FIG. 2A, and indicates a gain to be applied depending on input luminance. The term "gain map" refers to an image in which a gain to be applied is set depending on a position inside an image as illustrated in FIG. 2B.

FIG. 1 illustrates a configuration of the image processing apparatus according to the present exemplary embodiment. The image processing apparatus according to the present exemplary embodiment includes at least one processor or circuit that functions as each unit illustrated in FIG. 1. The image processing apparatus can include at least one memory in which a variable and a program for causing the processor or the circuit to function as each unit is stored. As illustrated in FIG. 1, the image processing apparatus according to the present exemplary embodiment includes an image input unit 101, a first reduced image generation unit 102, a second reduced image generation unit 103, a first gain conversion unit 104, and a first gain map generation unit 105. Moreover, the image processing apparatus according to the present exemplary embodiment includes a second gain conversion unit 106, a second gain map generation unit 107, a mix ratio calculation unit 108, a third gain map generation unit 109, and a gain processing unit 110. The image processing apparatus of the present exemplary embodiment performs gain processing on an image that has been input and processing for outputting the resulting image. The image to be input to and output from the image processing apparatus of the present exemplary embodiment is configured by a luminance signal.

The image input unit 101 is a member to which an input image to be subject to gain processing is input. The input image which has been input to the image input unit 101 is supplied to the first reduced image generation unit 102, the mix ratio calculation unit 108, and the gain processing unit 110. The first reduced image generation unit 102 performs reduction processing on the input image supplied via the image input unit 101 to generate a first reduced image. The second reduced image generation unit 103 performs further reduction processing on the first reduced image generated by the first reduced image generation unit 102 to generate a second reduced image. Accordingly, the image processing apparatus of the present exemplary embodiment generates reduced images having different reduction ratios by using the first reduced image generation unit 102 and the second reduced image generation unit 103.

The first gain conversion unit 104 generates gain maps, as gains for non-gradation areas based on a first gain characteristic, for the images generated by the first reduced image generation unit 102 and the second reduced image generation unit 103. That is, the first gain conversion unit 104 generates a gain map corresponding to the first reduced image and a gain map corresponding to the second reduced image based on a first gain characteristic. The first gain characteristic is a gain characteristic in which different gains are set depending on luminance values. For example, the first gain characteristic includes a gain characteristic by which tone correction (tone compression) intended to be performed on an input image is performed such that a dark portion is brightened and a bright portion is darkened as illustrated in an example in FIG. 3A.

The first gain map generation unit 105 generates a first gain map for a non-gradation portion based on the plurality of gain maps generated by the first gain conversion unit 104. That is, the first gain map generation unit 105 combines the gain map corresponding to the first reduced image generated by the first gain conversion unit 104 with the gain map corresponding to the second reduced image generated by the first gain conversion unit 104 at a predetermined mix ratio to generate a first gain map.

The second gain conversion unit 106 generates a gain map, as a gain for a gradation portion based on a second gain characteristic, for each of the images generated by the first reduced image generation unit 102 and the second reduced image generation unit 103. That is, the second gain conversion unit 106 generates each of a gain map corresponding to the first reduced image and a gain map corresponding to the second reduced image based on a second characteristic. The second gain characteristic includes a gain characteristic having a smaller change in gradient of the gain characteristic than the first gain characteristic, as illustrated in examples in FIGS. 3B and 3C, based on the above-described first gain characteristic. That is, the second characteristic is set to a gain characteristic in which an amount of change in gain with respect to a change in luminance value is more reduced (an amount of change is smaller) than the first chain characteristic.

The second gain map generation unit 107 generates a second gain map for a gradation portion based on the plurality of gain maps generated by the second gain conversion unit 106. That is, the second gain map generation unit 107 combines the gain map corresponding to the first reduced image generated by the second gain conversion unit 106 with the gain map corresponding to the second reduced image generated by the second gain conversion unit 106 at a predetermined mix ratio to generate a second gain map.

The mix ratio calculation unit 108 detects a gradation area such as a blurred portion in an image based on the input image supplied via the image input unit 101 and the image generated by the first reduced image generation unit 102. The mix ratio calculation unit 108 is one example of a detection unit. Based on a result of the gradation area detection, the mix ratio calculation unit 108 generates an image indicating a mix ratio for each area and corresponding to a degree of gradation.

The third gain map generation unit 109 generates a third gain map to be used in gain processing on the input image based on the mix ratio image generated by the mix ratio calculation unit 108. The third gain map generation unit 109 applies, based on the mix ratio image, a value of the second gain map to a gradation area and a value of the first gain map to an area that is not the gradation area to generate a third gain map.

The gain processing unit 110 performs gain processing on the input image supplied via the image input unit 101 based on the third gain map generated by the third gain map generation unit 109. The image on which tone correction (tone compression) by the gain processing based on the third gain map has been performed by the gain processing unit 110 is output as an output image.

Figure 4:
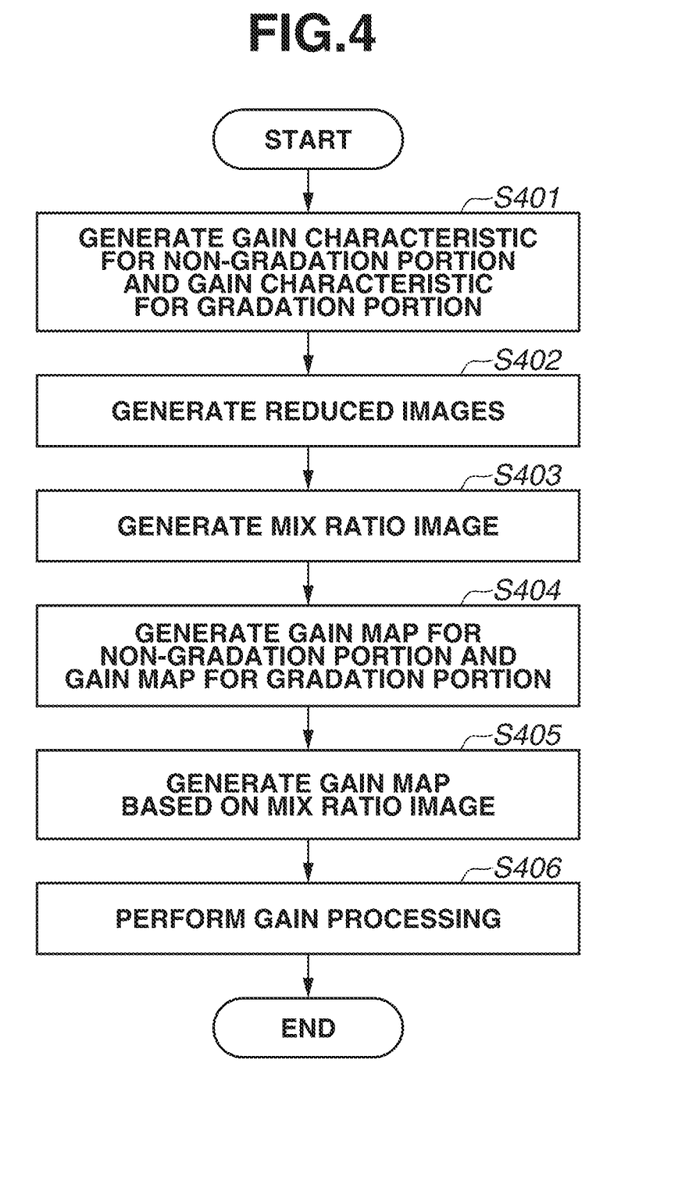
FIG. 4 is a flowchart illustrating an example of processing performed by the image processing apparatus according to the present exemplary embodiment.

FIG. 4 is a flowchart illustrating an example of processing performed by the image processing apparatus according to the present exemplary embodiment.

In step S401, the first gain conversion unit 104 and the second gain conversion unit 106 generate a gain characteristic (a first gain characteristic) for a non-gradation portion and a gain characteristic (a second gain characteristic) for a gradation portion. The gain characteristic for the non-gradation portion is a gain characteristic 301 as illustrated in the example in FIG. 3A, and the gain characteristic for the gradation portion is a gain characteristic 311 as illustrated in the example in FIG. 3c.

Figure 3A:
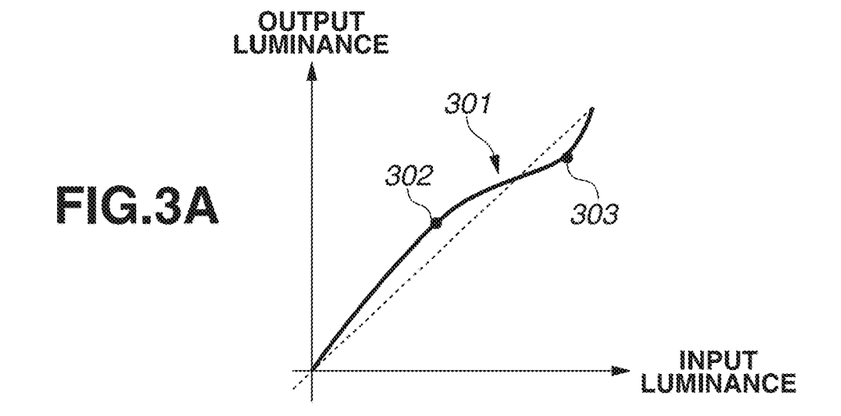
FIGS. 3A, 3B, and 3C are diagrams illustrating generation of a gain characteristic.

A method for generating a gain characteristic will now be described. The gain characteristic for the non-gradation portion is set to a gain characteristic such that a dark portion is brightened and a bright portion is darkened to express an object with rich tone characteristics even in a wide dynamic range scene as illustrated in the example in FIG. 3A. For example, on a tone curve, points such as a point 302 and a point 303 illustrated in FIG. 3A are determined. At the point 302, luminance of a predetermined dark portion is increased, and at the point 303, luminance of a predetermined bright portion is reduced. A line that smoothly connects the points 302 to 303 is set to a gain characteristic 301 for a non-gradation portion.

Figure 3B:
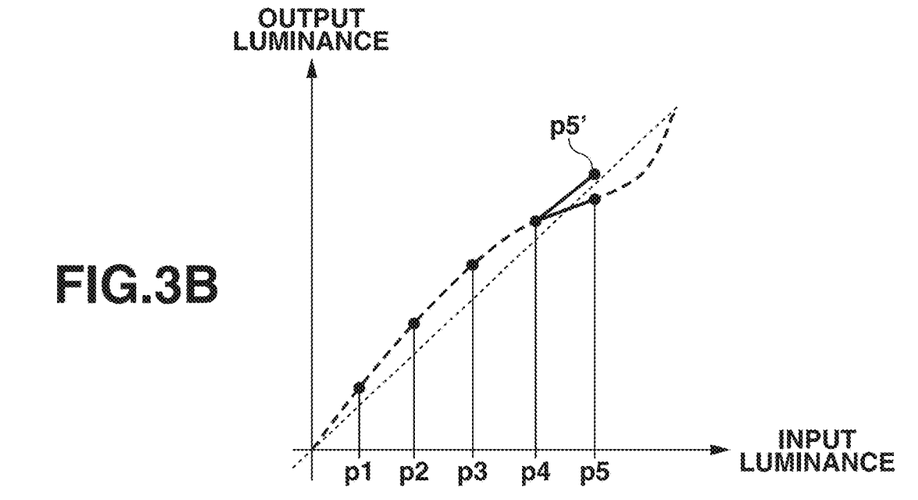
Figure 3C:
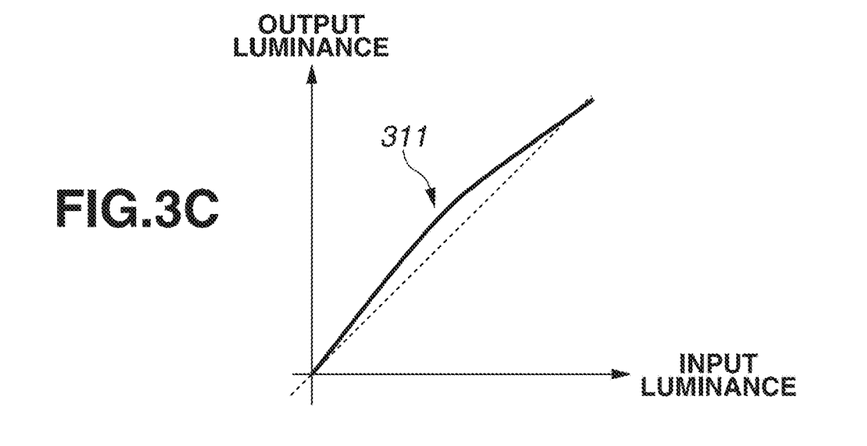

Next, a method for generating a gain characteristic for a gradation portion will be described with reference with FIG. 3B. As for the gain characteristic for the gradation portion, a gain in which a change in gradient of a gain characteristic is reduced is generated based on a gain characteristic for a non-gradation portion. In tone correction, in a case where gain processing in which a gain to be applied for each luminance range markedly differs is performed, a loss of smooth tone change occurs in an image, and a false contour is generated in a gradation area such as a blurred portion. For this reason, by reducing a change in gain characteristic with respect to a change in luminance range (that is, a change in gradient on a tone curve), such a phenomenon can be reduced.

One example of a method for reducing a change in gradient of gain characteristic will now be described with reference to FIG. 3B. First, points, for example, points p1 to p5 as illustrated in FIG. 3B, are set at a predetermined input luminance interval with respect to a gain characteristic for a non-gradation portion as illustrated in FIG. 3A. Next, a gradient of gain characteristic is determined for each section (between points on the tone curve) such as a section between points p1 and p2 and a section between points p2 and p3 in ascending order of input luminance, and then it is determined whether the resultant gradient exceeds a predetermined value g_th. For example, if a difference between a gradient g3 of a section between points p3 and p4 and a gradient g4 of a section between points p4 and p5 exceeds g_th, a point p5' on a line with a gradient g4' determined by equations below is defined, and the position of the point on the tone curve is changed.

$$\text{If } g3 < g4, g4' = g4 + g\_th \quad \text{Equation 1}$$

$$\text{If } g3 \geq g4, g4' = g3 - g\_th \quad \text{Equation 2}$$

Thereafter, a gradient of a section between the point p5' and the subsequent point is determined, and such processing is repeated.

Accordingly, such processing can generate a gain characteristic 311 as illustrated in FIG. 3A. In the gain characteristic 311, changes in gradient of gain characteristics in adjacent sections are less than the predetermined value of g_th in the entire luminance range. This is set to a gain characteristic for a gradation portion.

Referring back to FIG. 4, in step S402, the first reduced image generation unit 102 and the second reduced image generation unit 103 generate a first reduced image and a second reduced image. The first reduced image generation unit 102 performs reduction processing on an input image to generate a first reduction image, whereas the second reduced image generation unit 103 performs reduction processing on the first reduced image generated by the first reduced image generation unit 102 to generate a second reduced image. As for the reduction processing method, a general method such as reduction using a bilinear method can be used.

Figure 5A:
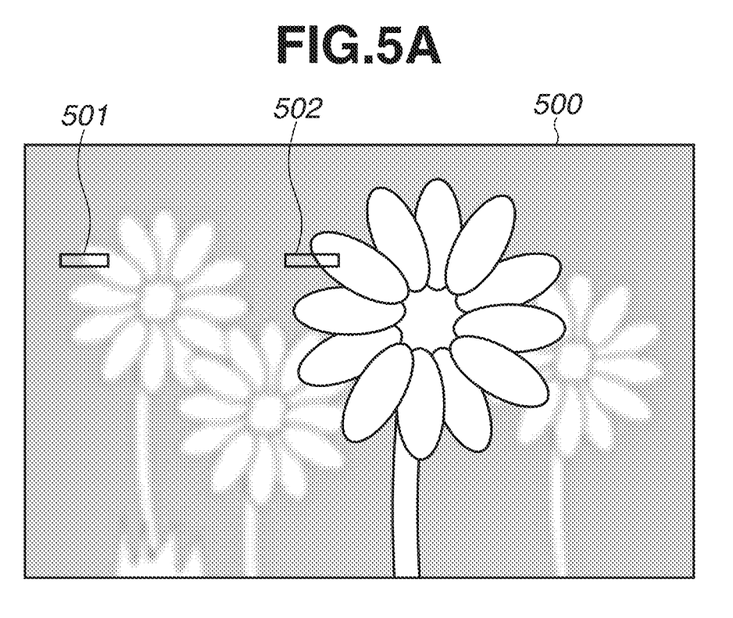
FIGS. 5A and 5B are diagrams each illustrating one example of an input image.

In step S403, the mix ratio calculation unit 108 generates a mix ratio image. As mentioned above, the mix ratio image is used for the purpose of determining a degree of gradation. Although various methods achieving such a purpose can be used, a method for determining a gradation area by using an input image and a reduced image is herein described as one example. FIG. 5A is an example of an input image 500. In FIG. 5A, an area 501 indicates one portion of an optically blurred flower, and an area 502 indicates one portion of a flower in focus. First, the mix ratio calculation unit 108 enlarges the first reduced image generated by the first reduced image generation unit 102 to a size of the input image. This processing generates a low frequency image as if low-pass filter processing is performed on the image.

Figure 6A:
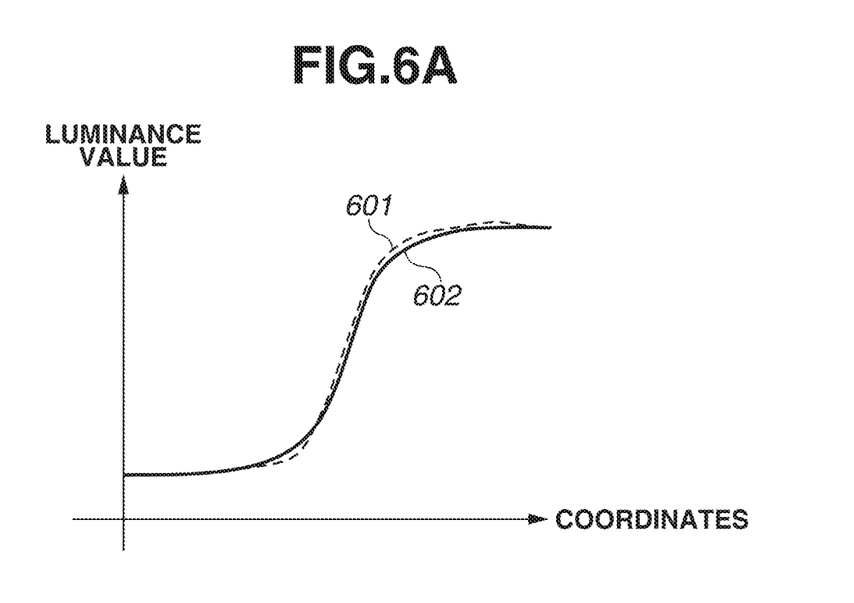
FIGS. 6A and 6B are diagrams each illustrating detection of a gradation area.
Figure 6B:
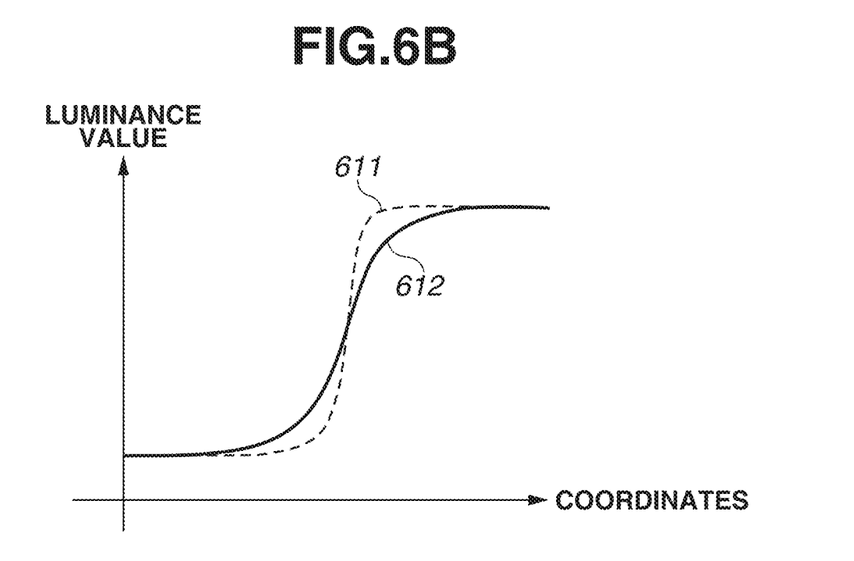

FIG. 6A is a graph in which a luminance value of the area 501 of the blurred portion is plotted by coordinates. In FIG. 6A, a broken line 601 indicates a luminance value of the area 501 of the blurred portion in an input image, and a solid line 602 indicates a luminance value of the area 501 of the blurred portion in an image (a low frequency image) acquired by performing enlargement processing on a first reduced image. FIG. 6B is a graph in which a luminance value of the area 502 of an in-focus portion is plotted by coordinates. In FIG. 6B, a broken line 611 indicates a luminance value of the area 502 of the in-focus portion in an input image, and a solid line 612 indicates a luminance value of the area 502 of the in-focus portion in an image (a low frequency image) acquired by performing enlargement processing on a first reduced image.

As illustrated in FIG. 6A, since the input image is a low frequency image in the first place, the blurred portion in the image has a smaller difference in luminance values between corresponding pixels of an input image and a low frequency image acquired by performing enlargement processing on a reduced image. On the other hand, as illustrated in FIG. 6B, the in-focus portion in the image has a larger difference in luminance values between corresponding pixels of an input image and a low frequency image acquired by performing enlargement processing on a reduced image since a frequency is reduced after an image goes through reduction and enlargement processing.

Figure 5B:
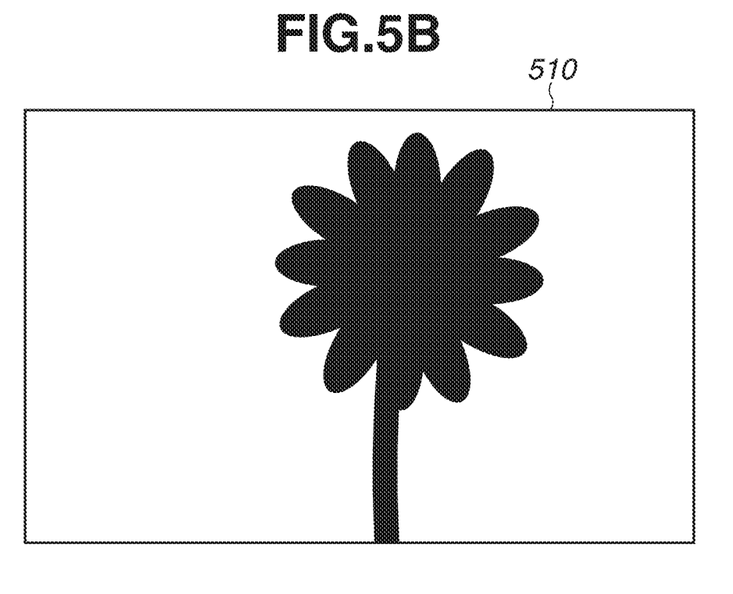

Accordingly, based on the luminance value difference between the input image and the low frequency image acquired by performing the enlargement processing on the reduced image, the mix ratio calculation unit 108 generates an image in which a pixel value is made smaller as a luminance value difference becomes larger and a pixel value is made larger as a luminance value difference becomes smaller. The generated image is referred to as a mix ratio image. For example, if such a method is used to generate a mix ratio image for the input image 500 of the scene illustrated in FIG. 5A, a mix ratio image 510 illustrated in FIG. 5B is provided. Accordingly, such processing can generate a mix ratio image indicating a degree of gradation and having a larger pixel value in a gradation area and a smaller pixel value in an area that is not the gradation area. A binary image based on whether a luminance value difference is greater than a predetermined value may be used as a mix ratio image instead of an image based on the pixel value according to the luminance value difference between the corresponding pixels in the input image and the low frequency image acquired by performing enlargement processing on the reduced image.

Referring back to FIG. 4, in step S404, the first gain map generation unit 105 generates a first gain map for a non-gradation portion, and the second gain map generation unit 107 generates a second gain map for a gradation portion. In step S404, first, each of the first gain conversion unit 104 and the second gain conversion unit 106 generates a plurality of gain maps corresponding to each reduced image. Then, the first gain map generation unit 105 generates a first gain map for a non-gradation portion based on the plurality of gain maps generated by the first gain conversion unit 104. Moreover, the second gain map generation unit 107 generates a second gain map for a gradation portion based on the plurality of gain maps generated by the second gain conversion unit 106.

Next, in step S405, the third gain map generation unit 109 generates a third gain map based on the mix ratio image generated in step S403 and the first gain map and the second gain map generated in step S404. For example, the third gain map generation unit 109 selectively applies a value of the first gain map or a value of the second gain map to each area in the input image according to the mix ratio image to generate a third gain map.

In step S406, the gain processing unit 110 performs gain processing on the input image based on the third gain map generated in step S405.

The image processing apparatus according to the present exemplary embodiment generates a gain characteristic for a non-gradation portion and a gain characteristic for a gradation portion in which a change in gradient of the gain characteristic is less than a predetermined value in the entire luminance range. The image processing apparatus according to the present exemplary embodiment applies the gain characteristic for the non-gradation portion and the gain characteristic for the gradation portion to generate a third gain map to be used in gain processing based on a mix ratio image indicating a degree of gradation. This enables performing of gain processing by which a gain for a gradation portion is selectively applied to a gradation portion. Therefore, the image processing apparatus according to the present exemplary embodiment can perform desired tone correction on a non-gradation area while reducing generation of a false contour in a gradation area such as a blurred portion in an image. The desired tone correction for a non-gradation area includes tone compression enabling a characteristic of a wide dynamic range scene to be reproduced.

The image processing apparatus according the above-described exemplary embodiment generates a first gain map based on a first gain characteristic which serves as a reference, and a second gain map based on a second gain characteristic in which a change in gain characteristic is reduced based on the first gain characteristic. The image processing apparatus, based on a mix ratio image, applies a gain that is a mix of the first gain map and the second gain map, so that application of the gain in which an amount of change in gain with respect to luminance is reduced is realized. However, the above-described exemplary embodiment is not limited to thereto. For example, the image processing apparatus can employ a method in which low-pass filter processing is performed on a gradation detection area in a first gain map without generation of a second gain map to reduce an abrupt change in gain with respect to input luminance inside a gradation area.

Moreover, the image processing apparatus according to the above-described exemplary embodiment generates two reduced images that are a first reduced image and a second reduced image from an input image to perform processing. However, the above-described exemplary embodiment is not limited thereto. The image processing apparatus may generate three or more reduced images to perform processing.

The aforementioned exemplary embodiment has been described using an example in which an optically blurred area is a gradation area having a smooth tone change. However, the above-described exemplary embodiment is not limited thereto. A gradation area having a smooth tone change can be, for example, an object such as the sky and a wall surface the tone change of which is smooth, and an area such as a blurring area and an area on which low-pass filter processing has been performed in an optical manner or by image processing. The present exemplary embodiment is applicable to even such an area since a false contour can be generated by the similar reason.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-009386, filed Jan. 23, 2020, which is hereby incorporated by reference herein in its entirety.

What is claimed is:

1. An apparatus comprising:
   at least one processor; and
   a memory coupled to the at least one processor, the memory having instructions that, when executed by the processor, perform operations as:
   a detection unit configured to detect a gradation area in an input image;
   a generation unit configured to generate a third gain map based on a first gain map generated based on a first gain characteristic, a second gain map generated based on a second gain characteristic, and a detection result acquired by the detection unit; and
   a processing unit configured to perform gain processing on the input image based on the generated third gain map,
   wherein, in the first gain characteristic, different gains are set depending on luminance values, and in the second gain characteristic, an amount of change in gain with respect to a change in luminance value is more reduced than the first gain characteristic, and
   wherein the generation unit applies, based on the detection result acquired by the detection unit, a value of the first gain map to an area which is not the gradation area and a value of the second gain map to the gradation area to generate the third gain map.

2. The apparatus according to claim 1, wherein the detection unit detects the gradation area in the input image based on the input image and a reduced image that is generated by performing reduction processing on the input image.

3. The apparatus according to claim 2, wherein the detection unit determines that an area having a smaller difference in luminance values between corresponding pixels of the input image and the reduced image is the gradation area.

4. The apparatus according to claim 1,
   wherein the first gain map is generated based on a plurality of gain maps based on the first gain characteristic and corresponding to a plurality of reduced images generated by performing reduction processing on the input image, and
   wherein the second gain map is generated based on a plurality of gain maps based on the second gain characteristic and corresponding to a plurality of reduced images generated by performing reduction processing on the input image.

5. The apparatus according to claim 1, wherein the second gain characteristic is generated by changing a position of a point on a tone curve based on a first gain characteristic generated using the tone curve such that a change in gradient between points on the tone curve is less than a predetermined value.

6. A method comprising:
   detecting a gradation area in an input image;
   generating a third gain map based on a first gain map generated based on a first gain characteristic, a second gain map generated based on a second gain characteristic, and a detection result acquired by the detecting; and
   performing gain processing on the input image based on the generated third gain map
   wherein, in the first gain characteristic, different gains are set depending on luminance values, and in the second gain characteristic, an amount of change in gain with respect to a change in luminance value is more reduced than the first gain characteristic, and
   wherein the generating applies, based on the detection result acquired by the detecting, a value of the first gain map to an area which is not the gradation area and a value of the second gain map to the gradation area to generate the third gain map.

7. The method according to claim 6, wherein the detecting detects the gradation area in the input image based on the input image and a reduced image that is generated by performing reduction processing on the input image.

8. The method according to claim 7, wherein the detecting determines that an area having a smaller difference in luminance values between corresponding pixels of the input image and the reduced image is the gradation area.

9. A non-transitory computer-readable storage medium storing a program for causing a computer to execute a method, the method comprising:

detecting a gradation area in an input image;

generating a third gain map based on a first gain map generated based on a first gain characteristic, a second gain map generated based on a second gain characteristic, and a detection result acquired by the detecting; and performing gain processing on the input image based on the generated third gain map wherein, in the first gain characteristic, different gains are set depending on luminance values, and in the second gain characteristic an amount of change in gain with respect to a change in luminance value is more reduced than the first gain characteristic, and wherein the generating applies, based on the detection result acquired by the detecting, a value of the first gain map to an area which is not the gradation area and a value of the second gain map to the gradation area to generate the third gain map.

10. The non-transitory computer-readable storage medium according to claim 9, wherein the detecting detects the gradation area in the input image based on the input image and a reduced image that is generated by performing reduction processing on the input image.

11. The non-transitory computer-readable storage medium according to claim 10, wherein the detecting determines that an area having a smaller difference in luminance values between corresponding pixels of the input image and the reduced image is the gradation area.

* * * * *